Oct. 27, 1942.    F. W. BAUM    2,300,092
WEATHER COMPENSATING TEMPERATURE CONTROL DEVICE
Filed Oct. 11, 1939
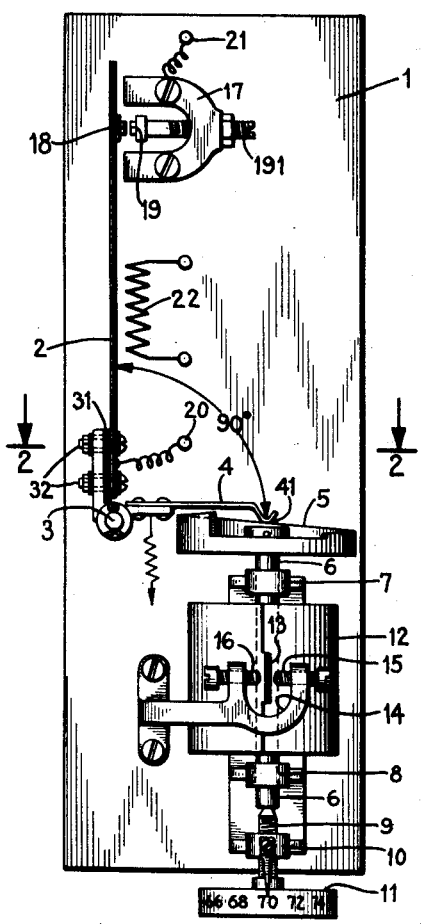
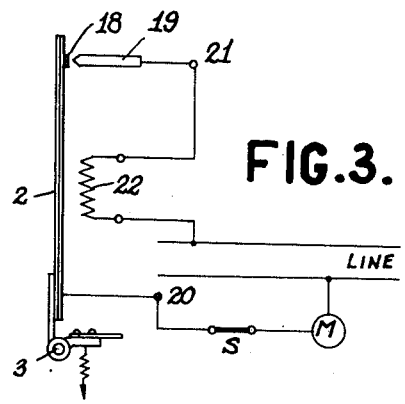
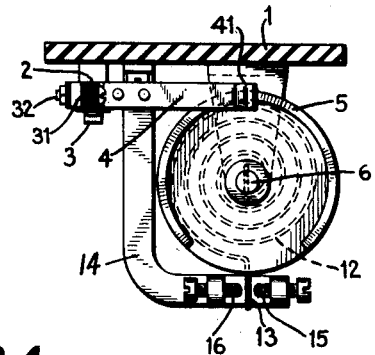
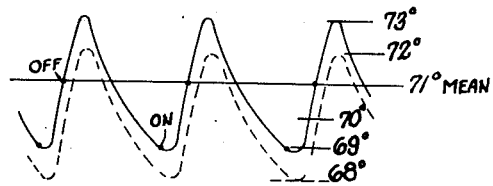
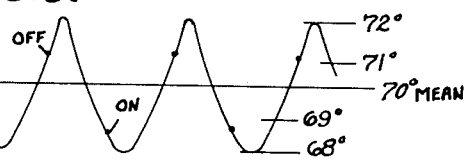
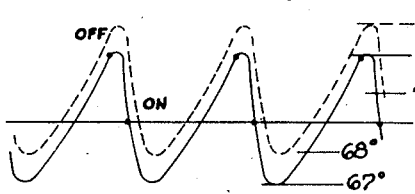
INVENTOR
F. WILBUR BAUM
BY
ATTORNEY Patented Oct. 27, 1942

2,300,092

UNITED STATES PATENT OFFICE 2,300,092

WEATHER COMPENSATING TEMPERATURE CONTROL DEVICE

Frederick Wilbur Baum, Scarsdale, N. Y., assignor of one-fourth to Samuel Ruben, New Rochelle, N. Y., and one-fourth to Malcolm W. Clephane, Englewood, N. J.

Application October 11, 1939, Serial No. 298,873

12 Claims. (Cl. 236—68)

This invention relates to stabilization of indoor temperatures, illustrated as effected by a thermostatic switch responsive to variations in air temperature within an enclosed space, together with automatic or monitor means for compensating for changes in the mean of the oscillating temperature of the space and maintaining such mean within close limits, notwithstanding outdoor weather or temperature changes tending to cause substantial indoor variations.

Broadly, the object of my invention is the close controlling or stabilizing of indoor atmospheric temperatures throughout varying outdoor conditions. A specific object is the provision of automatic means for progressively adjusting or resetting a thermostat, which controls a heat regulating circuit, in response to the resulting variations in the mean of the temperature oscillation of the indoor air. Another object is the provision of automatic means for so controlling the temperature of the enclosed or indoor atmosphere as to maintain at a desired level the mean of the oscillating temperature thereof. Other objects will be apparent as the disclosure proceeds.

The prevailing types of thermostat control for air temperatures in an enclosed space afford an operation the results of which are intended to be a function of the prevailing outside thermal condition. During severe cold weather periods the rate of indoor air heating is slow and the rate of cooling rapid, while during mild weather the rate of heating is rapid and that of cooling is slow. When rapid changes in indoor air temperature occur, with rising and falling oscillations, the thermal inertias of the usual thermostat and the heating plant induce decided drifts in the resulting mean indoor air temperature, being inherently downward in cold weather and upward in mild weather. Therefore, to promote uniformity of controlled temperature it was necessary to adjust correctively the setting of the thermostat according to the prevailing outside thermal conditions as manifested in indoor results. The known application of auxiliary heat, as by a resistor heating element, to the usual thermostat during heating intervals or operations has resulted in reducing the upward drift and overruns in oscillations of indoor air temperature in mild weather; but this method has the disadvantage of increasing the underruns and downward drift in cold weather by an equivalent amount, creating a decided inadequacy of result.

Broadly, my invention provides a monitoring means by which a primary thermostat is automatically continuously set or adjusted in response to and in accordance with the results of variations in external thermal conditions or specifically in accordance with the rate of thermal drift in the enclosed atmosphere, thus stabilizing that atmosphere with only minor deviations from the predetermined temperature.

This invention employs a primary thermostatic element for opening and closing a circuit controlling a heating plant or furnace, and a secondary thermostatic element which, responsive to variations drifting from the predetermined mean temperature as a function of variations in external temperatures, changes the basic relation or position of the contacts controlling the heat control circuit.

In any embodiment of my invention auxiliary heat may advantageously be applied to the primary thermostatic element during active heating operations and without introducing excessive thermal under-runs of the indoor air during severe low outside temperatures. With milder outside thermal conditions when over-runs are inclined to be excessive, if the auxiliary heat is applied to the primary thermostatic element, the secondary or monitor thermostat or bimetallic element prevents any major deviation from the desired temperature.

While I have illustrated my invention as employing a compensating thermostat in the form of a spiral, it may be in any other mechanical form which provides for a rotary motion of a cam or equivalent structure, to effect the automatic readjustment of the controlling thermostat.

Referring to the drawing, Figure 1 is a front elevation of an embodiment of my device with the casing removed;

Figure 2 shows a top view in horizontal section taken at 2—2.

Figure 3 shows a circuit diagram illustrative of a mode of connection between the thermostatic devices and the motor which regulates or operates the heating plant.

Figures 4 to 6 are similar temperature diagrams for explaining the controlling and stabilizing operations under different outdoor weather conditions.

At 1 is a supporting panel or base upon which the device is mounted; 2 is a primary bimetallic or thermostatic strip swingingly mounted by shaft 3, from which it is insulated by Bakelite block 31, like insulation being provided for bolt assemblies 32, the more expansive metal of the bimetal strip being on the side upon which the contact point 18 is mounted. Secured to the bearing hub upon which is mounted thermostatic strip 2, is rigid lever arm 4, the free or distal end of which at 41, contacts upon inclined cam 5, shown as rotary and attached to shaft 6 passing through upper and lower bearings 7 and 8 respectively.

In the arrangement illustrated the thermostatic element 2, preferably extends radially from the centre of shaft 3 and is normally set at an angle of 90° with a horizontal line defined by the centre of shaft 3 and point of contact 41 of lever 4 with the surface of cam 5.

Shaft 6 rests upon needle pointed screw 9 which is positioned within threaded bearing 10 and adjusted vertically by the turning of calibrated screw head 11. Attached to shaft 6 is the inner end or terminus of a bimetallic coil strip 12 having the more expansive metal located on the outer side, the free or distal end of the coil being reduced to a narrower width or terminus 13, and bent outwardly in a radial direction to project freely between spaced apart screws 15 and 16 mounted upon bracket 14.

Positioned at the upper end of primary bimetallic strip 2 is a permanent magnet 17 to provide snap action between movable contact 18 mounted on bimetallic strip 2, and relatively fixed contact 19. Electrical terminals 20 and 21 are provided in the thermostatic control circuit. Contact screw 191 provides an adjustment of fixed contact 19 to vary initially the "on" and "off" temperature setting. By means of resistance wire 22, auxiliary heat is provided for bimetallic strip 2, becoming heated, as already described, during the times when the heating plant is in active operation, whether it be a furnace fired by oil, or by coal, gas or otherwise. The resistance heater 22 stands adjacent to the primary thermostat strip 2, and electrically it may be associated in various ways with the thermostat 2, 19, and with the motor which controls or regulates the furnace, so long as the heater is energized during the periods of furnace operation only. Thus a known mode of interconnecting these elements is that shown in the Shafer Patent 1,583,496 of May 4, 1926, wherein the furnace circuit is in parallel to the thermostat circuit but associated therewith by relay; but for illustrative purposes Fig. 3 indicates the series arrangement, in a single circuit, of the heater 22, the thermostat 2, 19 and the furnace motor M, in the general manner shown in Warren Patent 1,564,804 of December 8, 1925; a supplemental switch S being shown in the circuit for general shut-off purposes, manual or automatic.

The thermostatic control, as illustrated in Fig. 1, is set to provide a mean air temperature of 70°. This setting is made by the manual rotation of calibrated screw 11 which determines the operating level of inclined cam 5, which in turn positions and basically sets the primary bimetallic strip 2 for properly regulating the desired air temperature.

The action of the monitoring bimetallic coil 12 is nil when the correct mean air temperature is being maintained. Screws 15 and 16 are initially adjustable to provide a gap and lost motion to permit distal end 13 to oscillate idly therebetween during normal heating cycles. If the rate of heating of the air is equal to the rate of cooling in each oscillation the distal end 13 oscillates equal distances and idly from a midpoint between screws 15 and 16, causing no mechanical actions and representing 70°. If the rate of cooling exceeds that of heating the distal end 13 will oscillate now from a midpoint less than 70° and will strike screw 16 whereby actual motion is caused, turning the shaft 6, and the inclined cam 5 will be rotated counterclockwise and thus reset the primary thermostat to raise the "on" and "off" temperatures of bimetallic strip 2. This performance will continue during successive heating cycles until a temperature balance is maintained between the instrument and the indoor air for any particular weather condition. The distal end 13 of bimetallic coil 12 will then again oscillate idly between contact stops 15 and 16, until the mean air temperature is subjected to a further change or drift. If the rate of heating exceeds the rate of cooling, the same process is instituted in the reverse order, during outdoor drift to warmer levels.

Bimetallic coil 12 should be of suitable gauge and of sufficient width to provide the necessary mechanical operating power for the cam 5, since a yielding or storing up of appreciable potential energy in this element would affect the accuracy of the mean temperature adjustment.

Theoretically, the greater the deflection per degree of temperature for bimetallic coil 12, the less will be the deviation from the desired mean air temperature. If 1 or unity represents the normal deflection of the primary thermostatic element 2 for one degree change in its temperature; and $d$ represents the deflection of the primary thermostatic element caused by a one degree change in the temperature of the secondary thermostatic element with its distal end fixed; then $1/1+d$ expresses the resulting extent of mean temperature drift, when the normal unrestricted mean temperature drift of the primary element is considered a standard for measurement of mean air temperature drift.

Although this device is described in reference to controlling air temperature by the regulation of a heating plant, it is understood that the same principles can be employed in a reverse manner for the regulation of a refrigerating plant.

The principles and operation of the invention may be further explained as follows. The heating plant is assumed to have a heating capacity adequate to maintain the desired indoor air temperature under the most severe expected outdoor conditions. The primary thermostat regulates the plant, while the monitor thermostat, responsive to the same indoor air temperature variations, gives continuous control over the primary by resetting it as needed to stabilize the mean room air temperature desired, that is, a mean, such as 70°, of the up-and-down temperature oscillations, as in the range between 68° and 72°. For description the primary may be considered as normally or under medium conditions turning "on" the heat when the room temperature drops to 69° and "off" again at 71°, the thermal inertia or lag carrying it beyond these as the oscillations above and below the mean continue. All figures are taken as mere illustrative examples. The lag is a combination of the inertia in the thermostat and that in the burner or furnace and in the distribution of the heat.

The action will first be described without reference to the artificial heater coil or accelerator 22, and will be seen to give such complete control over the primary action, by resetting as needed, that it allows a heater coil to be used to abbreviate the oscillating rises in mild weather without prolonging the drops of temperature in cold weather. The general drift tendency of the oscillation range or its mean is what the monitor responds to, this drift of room air temperature being always up in mild outdoor weather, as 60°, and down in cold weather, as 20°, but absent at some medium, as 40°, taken for illustration. The drift tendency is the result of outdoor drift of conditions, such as the approach of a cold wave, a matter of days, and this is what influences the monitor, while the primary is concerned only with short room air changes within a single day or hour.

The primary thermostat 2, 18, 19 has its active member or bimetal strip 2 cooperative with the passive member 19, which might comprise opposite contacts but is shown of the type with contact 19 at one side only of the strip, cooperative with the magnet 17 which pulls the iron component of the strip to give a snap action whereby the contacts 18, 19 are either in firm contact or well separated. These parts are merely an illustrative example of any available type of primary thermostat.

The monitor-produced resetting or automatic adjustment of the primary is of the nature of an alteration of the basic relation between the active member 2, 18 and the passive contact 19 or of one of the parts 4 or 17 carrying them. It is preferable thus to adjust the active member or strip 2 by resetting the mounting or lever 4 carrying it; this being shown as a minute bodily rocking of mounting lever 4 and strip 2, upon the pivot or axle 3.

The secondary or monitor thermostat, of special structure and function, operates only through the primary and only under drift changes for its auxiliary control. The monitor may be of any thermostatic type, being shown as a bimetal strip 12, shaped spirally for compactness, and giving an extended mechanical movement of its inner terminus at shaft 6 or its outer terminus or finger 13. This finger extends with loose play or lost motion in the gap between the fixed stops 15 and 16 adjustable on common bracket 14. The spiral strip or coil has its more expansive metal at the exterior of each convolution so that with room temperature rise the finger 13 tends to move rightward, toward stop 15 and vice versa. The monitor may be considered as consisting of the strip 12, its carrying terminus or shaft 6, its responding terminus or finger 13 and the cooperating spaced stops 15, 16; these stops being independently adjustable to predetermine both the extent of the gap and the position of each stop in relation to the other elements, and being in a sense the passive member of the monitor thermostat.

When the conventional operation of the primary thermostat causes up-and-down oscillations of room air temperature, the monitor, immersed in the same air, responds thereto, not actively for each variation of temperature, but actively to a shift of the range of oscillation, as will be further described. The response is manifested mechanically, and while the movement might be transmitted from either end of the bimetal strip, it is more advantageous to use the central end and shaft 6 while holding stationary the bracket and stops. When tendency to room temperature drift displaces the oscillation range, by either an abnormal expansion or contraction of strip 12, then the movement and reaction of finger 13 against one of the stops causes the shaft to turn in a corresponding corrective direction; and this transmits by a train shown as cam 5 and follower 41 to rock the support 4 and so to reset the active member 2 of the primary. The bimetal strip 12 is wide and thick enough to give a reliable mechanical action, while the cam or wedge 5 with its gentle slope gives a mechanical reduction, as is necessary to cause the minute resetting adjustments of the primary strip 2.

An important consideration may here be mentioned, that the low slope of the cam or rotary wedge 5 constitutes a one-way transmission and renders the train non-reversible; indicating that the secondary may adjust the primary thermostat while the primary can not affect the secondary, thus desirably protecting the latter from interference.

The plan of the present invention is not to arrange the monitor to produce resetting of the primary with every temperature change, but is to provide a substantial lost motion or idle play at some part of the train of connections, so that the bimetal strip 12 may normally cause the terminus or finger 13 to undergo a limited range of idle motion, that is, reciprocation without operative action. This provision for idle or inoperative play might be at any desired point in the train of connections from the bracket 14 through the spiral strip 12 and shaft 6 to the mounting or support 4 of the primary thermostat. It is very effectively provided by the device of the opposed stops 15 and 16, carefully adjusted and spaced so that the terminus finger 13 may reciprocate with idle play between them over a range corresponding substantially with the expected range of up and down temperature oscillation in the room, such as 4°, when under steady outdoor temperature or weather conditions. The resetting train with its lost motion gap is so devised that while the secondary thermostat terminus 13 undergoes normal reciprocations it transmits no motion, the shaft 6, cam 5 and lever 4 remaining stationary, and the primary thermostat operating in an ordinary manner. It is only when, due to a substantial change of outdoor temperature or weather, there is a drift of indoor range, accompanied by an excessive displacement of the responsive strip 12, that the lost motion is overtaken or exceeded; and this thermostat then becomes active, by resistance of one stop to finger 13, through shaft 6 and cam 5 to reset the primary thermostat for the purposes of this invention.

The function of the secondary is thus that of a monitor. It normally works idly with steady outdoor conditions and regular indoor oscillations, but stands ready upon an extensive outdoor change and consequent indoor tendency to drift and inaccuracy of primary control, to come into action to reset the primary mounting to meet the changed conditions and to bring the oscillation range and mean back to normal; this continuous supervising control thereby preserving a practically steady mean room temperature.

Figs. 4, 5 and 6 show examples of indoor temperature fluctuations of oscillatory character such as a conventional thermostat may produce. As an example a desired mean of 70° is assumed and a primary thermostat that turns the furnace on or up with drop to 69° and off or down with rise to 71° of room air temperature. Fig. 5, with medium outdoor temperature, as 40°, shows the normal expected operation under primary control. As each lowering phase of temperature reaches 69° the heat is restarted, but the lag or inertia causes further drop, as to 68°. With air temperature rise the heat remains on until at 71° it is cut off, lag causing continued rise, as to 72°. Thus is afforded a desirable oscillation range of 4° from 68° to 72° with a mean of 70°. As long as outdoor conditions continue steady this operation may continue indefinitely and during its continuance the monitor may remain substantially idle, the stops 15 and 16 being each in such an initially predetermined position that the reciprocating finger 13 will approximately come to it in each action. This adjustment of the stops is not critical so long as they practically provide a gap which the normal finger reciprocation substantially occupies.

The operation thus described on Fig. 5 occurs both with a simple thermostat and with the present invention, the monitor of the latter leaving the primary control unaffected during normal or steady conditions. Of course the air temperature range of 68° to 72° can be reduced, as by use of an artificial heating means 22 in heating relation to the main thermostat, but this is ignored in the discussion of Figs. 4 to 6, taken for illustrative explanation.

During the Fig. 5 oscillations the monitor of course responds with corresponding reciprocation of finger 13, but only idly between the stops. The finger reciprocation may be considered as approximately corresponding with the 4° air temperature range, with symmetrical 2° movements from either side of a midpoint or central position.

Assuming next mild outdoor conditions, as 60°, Fig. 4 shows in full lines the room air fluctuations as the primary thermostat alone would tend to control them. The rising phases are more rapid and steep and the descending more slow and gradual because the generated heat is not lost as rapidly. The thermal inertia is biased upwardly and overruns occur. As a consequence the range now may be for example from 69° to 73° with mean of 71°, or one degree higher than desired, and which may be still further excessive with still warmer weather. The usual thermostat still turns on the heat at 69° and off at 71°, but the indoor air is too warm, and this prevailing defect is what the present invention practically corrects or wholly eliminates.

What has happened in Fig. 4 is that the range and mean have become displaced upwardly one degree. The correction by the monitor is as follows. The finger 13 tends no longer to continue its 4° reciprocation between 68° and 72°, but by the expansion of strip 12 its range tends to shift abnormally rightward, in Figs. 1 and 2, this direction corresponding with a rising drift and the extent of shift being slight but sufficient to reset the primary for a one degree rise of control action, as expressed in the formula 1/1+d heretofore recited. The mean position or midpoint of finger 13 is slightly displaced rightward and, reciprocating about this new midpoint, 2° to each side, the finger forcibly contacts or strikes the righthand stop 15 and tends to thrust further, in reaction against the shaft 6 at the other end of the strip; but as the stops are fixed the reaction must move the strip inner terminus or shaft, which therefore is rotated clockwise, Fig. 2, to an extent corresponding to 1° at the primary thermostat. This clockwise turn carries the wedge-cam 5 in the same direction, thereby to raise the follower 41, and rock the support or lever 4 upwardly. This resets minutely the mounting of thermostat 2, 18, 19 and the basic relation of its contacts by an amount corresponding to one degree. Thus the control of the heating plant is altered and the heat is turned on and off approximately one degree lower or at 68° and 70° instead of 69° and 71° respectively.

The oscillating range then becomes restored approximately to 68–72° with a mean of about 70° as desired, as shown by the dotted curve in Fig. 4 which, as to range and mean is seen to be approximately the same as the curve of Fig. 5. Upon a still further rise of outdoor conditions the same resetting actions are repeated. Thus the monitor is on constant guard, acting during general drifts to keep the room mean temperature stabilized at about the predetermined 70°.

Assuming next cold outdoor conditions, as 20°, Fig. 6 in full line shows the operation of an ordinary thermostat, there being slow warmings of the indoor air, rapid coolings, and therefore underruns, which will be more emphatic with more frigid conditions. The thermal action is biased downward. The colder the weather the faster is heat subtracted from the room air, requiring increased plant operation. With a resulting indoor air mean of 69° and range of 67° to 71° the monitor now quickly acts reversely to the previous description, the finger 13 is thrust against the left stop 16, the shaft and cam turn counter-clockwise and the primary strip 2 is rocked slightly to the right, thus so changing the setting that the oscillation range is restored to 68–72° with the mean of 70°. This lifting of the control is indicated by the dotted curve in Fig. 6. The defective action of the primary is thus corrected by the supervising action of the monitor.

In all cases it is to be understood that the monitor action does not await the complete drift of 1° or other amount illustratively taken, but commences its corrective action with the initiation of such drift, as the aforesaid formula indicates. Of course, however, the actual resetting action by the monitor can only take place towards the end of an upward or downward air temperature oscillation; in other words it only follows the result of one given phase of the primary control.

The general result is as though an attendant person by observation should readjust an ordinary thermostat setting from 70° to 71° for example when, with an outdoor down-drift, it was found that the underruns caused a mean of 69°, the manual readjustment causing greater heating effect and restoration of the mean to 70°. The cam 5 if calibrated could be manually operated for this theoretical control. The monitor however detects early the tendency to a lowered range and it so resets the cam 5 and primary thermostat as to turn the heat on and lift the mean and the range by 1°, back to substantially what Fig. 5 indicates. A further downward drift will cause a further similar resetting, and so, step by step, the monitor keeps pace in stabilizing the room temperature as the large outdoor weather changes cause inaccuracies in the primary control. Whenever the outdoor temperature becomes steady, whatever the weather conditions, the monitor-set adjustment remains in effect to continue the indoor conditions, and the monitor reciprocations resume their idle character within the lost-motion gap.

In referring to the basic relation between the contact 19 and the strip 2 carrying the contact 18, and the resetting of their relation, this is to be understood as referring to their initial or structurally set relation at some given or normal temperature, independent of the effect of temperature changes. For example, taking a temperature at which the strip 2 is straight, whatever the basic relation, this may be reset either by turning the cam 5 to shift the strip and contact 18 or by bodily shifting the assemblage 17, 19. The relation might on some occasions involve a minus spacing, as when 18 bears upon 19 while the strip curvature under subnormal indoor temperature is such that the follower 41 is held slightly away from the cam. In any particular case it is the actual or potential basic relation that determines the controlling action of the primary thermostat, that is, its on-and-off or similar control of a heating furnace; and in any case the monitor thermostat causes the resetting of the basic relation and action of the primary.

Referring further to the auxiliary heating device 22, this may be a resistor, electrically connected to become energized during the periods that the heating plant is in operation. This heater 22 performs the known function of artificially warming the controlling thermostat to expedite the subsequent shutting off of the plant, which may occur within a brief period, thereby to minimize overheating by inertia. This is of considerable help in mild or warm weather, preventing temperature overruns, avoiding discomfort and saving fuel. When however outdoor temperatures are cold or progressively decreasing this heating device becomes a drawback because prematurely terminating each heating action necessary to maintain the desired mean. With the present invention this drawback does not exist, since the monitor thermostat takes complete supervision of the control and progressively resets the primary thermostat as needed and in a manner to offset the undersirable tendency of the heating device 22, and to prevent undue underruns.

The monitor, due to its lost motion, may be said to possess a greater differential action than the primary. The primary without artificial heating may change from "on" to "off" in a matter of 2°; the monitor has a gap corresponding to 4° and an on-and-off differential which is still larger. It therefore can not take control of the circuits as it would if its differential were too short, for example, if its finger 13 were anchored. The primary actions thus occur within the thermal differential or range of the monitor action. This is important, and the preferred operation of the present invention is dependent upon the temperature differential of the monitor being substantially greater than that of the primary, thereby preventing the monitor from acting as a furnace controlling thermostat. By employing the auxiliary heater 22 for the primary, the on-and-off temperature differential thereof can be made much smaller than otherwise, thereby permitting a correspondingly smaller differential for the monitor, and therefore bringing about a minimum range of air temperature in the air-temperature control. As an example, the primary differential may be much less than the 2° mentioned and even only a fraction of 1° when the auxiliary heat is used; while with the monitor the idle motion is the differential and may be reduced much below the 4° previously mentioned, even down to or below 1°, so long as it exceeds the primary differential. The smaller these differentials, within practical limits, the more continuous and finer is the ultimate control, but the differential of the monitor must exceed that of the primary, by reason of its lost-motion factor, in order that the drift, extending perhaps over days, may be attended to by the monitor while the primary controls the furnace, with many oscillations per day.

The lost motion gap in the train through which the monitor thermostat operates to reset the primary is therefore seen to be of high importance. If the terminal finger 13 of strip 12 were held fixed there would be no lost motion and the monitor would be in mere continuous tandem with the primary and the resultant control the mere sum of their actions at every instant in every oscillation. With the present invention the primary is left to attend alone and with satisfaction to all control when conditions are steady; it is the controller of the circuit and furnace whether the latter be of the intermittent or varying kind. The monitor attends merely to the effects of gradual downward or upward drift; and with each substantial outdoor fluctuation which tends to cause indoor underruns or overruns it comes into play to reset the primary and its action so that the primary then gives an adjusted control wherein the indoor air mean and range are restored to a desired normal.

The principles involved are believed to be new as a method, in which aspect they may be described as automatically regulating the primary thermostatic control of indoor temperatures, in order to stabilize the range of temperature oscillation which unavoidably results from such control, and thereby to afford a substantially steady mean indoor temperature. The method comprises employing a monitor or secondary thermostat and exposing it to the same oscillating indoor air temperatures thereby to undergo mechanical reciprocation within a given corresponding range of motion, and utilizing movements of such secondary thermostat which tend to go beyond such given range, due to substantial drift of outdoor temperature in either direction, to cause a resetting of the relation of the members of the primary thermostat such as substantially to restore the desired indoor temperature oscillation range and mean temperature. The monitor reciprocatory range is accommodated within a predetermined lost-motion gap to play idly therein during steady conditions, whereas with a departure of conditions motion is transmitted to readjust the relation of the members of the primary thermostat; and with gradual further resetting regulation during further drift of the conditions, thereby to maintain substantially steady the mean indoor temperature.

What I claim is:

1. A thermostatic apparatus for controlling and stabilizing indoor temperatures comprising, in combination, a primary thermostat arranged to control the heating or cooling plant and being adjustable to reset the mean of the indoor temperature oscillations caused by such control, a monitor thermostat exposed to such indoor oscillating air temperature so that its terminus is reciprocable in response thereto, and connections extending from the monitor to the primary thermostat through which abnormal movements of the monitor due to substantial drifts downwardly or upwardly of outdoor temperature are transmitted in a manner to reset the primary thermostat to cause it to restore or maintain a practically steady mean indoor temperature during such drifts; the monitor connections having a lost motion gap within which its reciprocations occur idly over a substantial extent of temperature differential, and the primary having an on-and-off differential which is substantially less than the differential of the monitor; whereby the primary has freedom of control action within the differential of the monitor to control furnace operation and air temperature, while the monitor is precluded from assuming such control and operates only to reset the primary as required by outdoor weather changes.

2. An apparatus as in claim 1 and wherein is an auxiliary heater in heating relation to the primary thermostat and energizing connections adapted to heat said heater during periods of operation only of the air heating plant thereby to accelerate each shutting off of the plant and prevent overruns; the monitor cooperating during periods of downward temperature drift to ensure a setting of the primary thermostat to prevent undue underruns in cold weather.

3. A thermostatic apparatus for controlling and stabilizing indoor air temperatures comprising a primary thermostat having a movable element and arranged to control continuously the heating or cooling plant and the resulting room air temperature and being mounted adjustably to reset the action of its movable element and thereby the range and mean of the room temperature oscillations caused by such control; and in operative combination therewith a monitor thermostat exposed and responsive to such indoor oscillating air temperature so that its movable element terminus is reciprocable in response thereto, and having a lost motion device associated with it of operative extent to accommodate idly its reciprocations when the room air mean temperature is steady; and adjusting connections extending from the monitor element to the primary thermostat through which, by reason of such lost motion action, abnormal movements only of the monitor due to substantial drifts downwardly or upwardly of outdoor temperature are transmitted, and the said connections being such that such transmitted abnormal movements cause resetting of the primary thermostat to restore or maintain a practically steady indoor temperature range and mean during such drifts.

4. An apparatus as in claim 3 and wherein is an auxiliary heater in heating relation to the primary thermostat and energizing connections adapted to heat said heater during periods of operation only of the air heating plant thereby to accelerate each shutting off of the plant and prevent overruns; the monitor cooperating during periods of downward temperature drift to ensure a setting of the primary thermostat to prevent undue underruns in cold weather.

5. A thermostatic apparatus for controlling and stabilizing indoor air temperatures comprising a primary thermostat having a movable element and arranged to control continuously the heating or cooling plant and the resulting room air temperature and being mounted adjustably to reset the action of its movable element and thereby the range and mean of the room temperature oscillations caused by such control; and in operative combination therewith a monitor thermostat exposed to such indoor oscillating air temperature so that its movable element terminus is reciprocable in response thereto, and having a lost motion device associated with it of operative extent to accommodate idly its reciprocations when the room air mean temperature is steady; and adjusting connections extending from the monitor element to the primary thermostat through which, by reason of such lost motion action, abnormal movements only of the monitor due to substantial drifts downwardly or upwardly of outdoor temperature are transmitted, and the said connections being such that such transmitted abnormal movements cause resetting of the primary thermostat to restore or maintain a practically steady indoor temperature range and mean during such drifts; the primary having an on-and-off thermal differential, and the monitor having in its connections a lost motion gap within which its motions are idle through a thermal differential in substantial excess over such primary differential; whereby the primary has freedom of control action within the extent of the monitor differential for sole continuous control of plant operation, while the monitor is precluded from such continuous control but operates only when outdoor weather drift requires resetting of the primary thermostat adjustment.

6. In combination with a primary thermostat to control a plant for heating indoor air, the same having a movable element and being adjustable to vary the controlling effect of such movement; a regulating secondary thermostat exposed to the same room air as the primary and comprising a bimetal element having a terminus normally reciprocable through a predetermined motion range under the influence of temperature oscillations of such air; a pair of spaced stops providing a gap accommodating such reciprocation of such terminus whereby its motion is idle while air temperature conditions remain substantially steady, but whereby pressure upon one of said stops and resultant movement is caused by reason of substantial change of air temperature conditions and consequent shift of such motion range; and transmitting connections from the secondary thermostat operable by such terminus pressure and resultant movement and extending to the primary thermostat to adjust the latter, and so alter the plant control, namely, in a direction and extent to restore or maintain a predetermined room air temperature range and mean; and said transmitting connections from secondary to primary thermostat including in train a one-way or wedge device preventing reverse transmission of movement therethrough from primary to secondary.

7. In combination with a primary thermostat to control a plant for heating indoor air, the same having a movable element and being adjustable to vary the controlling effect of such movement; a regulating secondary thermostat exposed and responding directly to the same room air temperature as the primary and comprising a bimetal element having a terminus normally reciprocable through a predetermined motion range under the influence of temperature oscillations of such room air; a pair of spaced stops providing a mechanical gap accommodating such reciprocation of such terminus whereby its motion is idle while air temperature conditions remain substantially steady, but whereby pressure upon one of said stops and resultant operative movement is caused by reason of substantial change of air temperature conditions and consequent shift of such motion range; and transmitting connections from the secondary thermostat operable by such terminus pressure and resultant movement and extending to the primary thermostat to adjust correctively the latter, and so to alter the plant control by the latter, namely, in a direction and extent to restore or maintain a predetermined room air temperature range and mean.

8. A thermostatic apparatus for controlling and stabilizing indoor temperatures comprising, in combination, a primary thermostat having a predetermined thermal differential and arranged to control continuously the heating or cooling plant and having an active heat-responsive member and a complementary passive member, one of which members is adjustably mounted to permit resetting the basic relation of the two members and thereby altering the thermostatic control of plant operation; a secondary thermostat having an active heat-responsive member adapted to deliver mechanical action, both such thermostats being immersed in and directly responsive to the indoor air to be stabilized; an operative connection between the two thermostats through which movements of the secondary active member may be transmitted to adjust the adjustable member of the primary; a lost-motion device associated with said secondary and transmitting connection and providing therefor a substantial extent of lost motion such that reciprocations of the secondary thermostat remain substantially idle or inoperative during steady room temperature oscillations within the range predetermined by the primary, but become operative with a tendency to drift of indoor range or mean temperature such as may result from substantial drift of outdoor temperature; thereby to cause corrective readjustment of the primary and its action to restore or maintain the predetermined range of indoor temperature oscillation and thereby preserve a practically steady mean indoor air temperature, notwithstanding outdoor weather variations.

9. Apparatus as in 8 and wherein the lost motion device for the transmitting connection comprises a pair of spaced stops in the space between which one terminus of the secondary thermostat plays.

10. Apparatus as in claim 8 and wherein the lost motion provided by a spaced pair of fixed stops providing a gap between which one terminus of the secondary thermostat plays; the active member being a coiled strip, and its other terminus acting through said connection to deliver the adjusting motion.

11. A thermostatic apparatus for controlling and stabilizing indoor temperatures comprising, in combination, a primary thermostat exposed to room air temperature and arranged to control the heating or cooling plant and being adjustable to reset the mean of the room air temperature oscillations caused by such control; a secondary thermostat also exposed and responsive to such oscillating room air temperature so that its terminus is reciprocable in response thereto; and means operatively connecting the two thermostates through which excessive reciprocation only of the secondary is transmitted to reset the primary thermostat in a manner to restore or maintain a practically steady mean indoor temperature; the secondary thermostat having a normal reciprocation range corresponding to the indoor temperature oscillation range, and the means operatively connecting the thermostats having associated therewith a device providing a lost motion of such extent that such normal range of reciprocation is idle, but such that an excess motion in either direction brings about an action of corrective resetting of the first thermostat.

12. A room air temperature stabilizing combination of an adjustable primary thermostat adapted continuously to control the furnace, and a monitor thermostat adapted occasionally to reset correctively the primary, namely, upon gradual outdoor drift of temperature, the primary at other times being free of influence by the monitor, and both thermostats being immersed in and immediately responsive to the same room air temperature; said combination including mechanism by which the monitor transmits resetting adjustment to the primary, and said mechanism having a mechanical gap presenting lost motion constituting the thermal differential of the monitor sufficiently great normally to accommodate substantially the thermal differential of the primary plus the thermal inertia of control, and so render idle the monitor action; whereby during steady weather conditions the primary alone causes steady room air temperature oscillations and mean without interference from the monitor, whereas on occasions of weather drift and consequent tendency of the mean room air temperature to shift the monitor causes resetting of the primary to correct such tendency and restore such mean.

F. WILBUR BAUM.